United States Patent
Zhang et al.

(10) Patent No.: US 12,047,803 B2
(45) Date of Patent: Jul. 23, 2024

(54) MEASUREMENT REPORTING METHOD AND RELATED DEVICE

(71) Applicant: Huawei Technologies Co., Ltd., Shenzhen (CN)

(72) Inventors: Lili Zhang, Beijing (CN); Guorong Li, Shenzhen (CN); Hongcheng Zhuang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/830,579

(22) Filed: Jun. 2, 2022

(65) Prior Publication Data

US 2022/0295329 A1 Sep. 15, 2022

Related U.S. Application Data

(63) Continuation of application No. 16/341,566, filed as application No. PCT/CN2016/101991 on Oct. 13, 2016, now Pat. No. 11,395,169.

(51) Int. Cl.
*H04W 24/10* (2009.01)
*H04B 7/06* (2006.01)
*H04W 16/28* (2009.01)

(52) U.S. Cl.
CPC .......... *H04W 24/10* (2013.01); *H04B 7/0626* (2013.01); *H04B 7/0628* (2013.01); *H04W 16/28* (2013.01)

(58) Field of Classification Search
None
See application file for complete search history.

(56) References Cited

U.S. PATENT DOCUMENTS

| 6,714,780 B1 | 3/2004 | Antonio et al. |
| 10,264,478 B2 | 4/2019 | Li et al. |

(Continued)

FOREIGN PATENT DOCUMENTS

| CN | 1845492 A | 10/2006 |
| CN | 101742530 A | 6/2010 |

(Continued)

OTHER PUBLICATIONS

Author Unknown, LTE, Evolved Universal Terrestrial Radio Access (E-UTRA), Radio Resource Control (RRC), Protocol specification, pp. 1-219, Feb. 2013.*

(Continued)

*Primary Examiner* — Christopher M Crutchfield
(74) *Attorney, Agent, or Firm* — SLATER MATSIL, LLP

(57) ABSTRACT

A measurement reporting method and device, the method including configuring, by a first network device, at least one of first information or second information for user equipment, the first information including a first or second threshold, the first threshold being associated with triggering a first type of measurement event and the second threshold associated with triggering a second type of measurement event, where the second information instructs the user equipment to report a first or second measurement result, the first measurement result being a cell measurement result, and the second measurement result a beam measurement result, delivering, by the first network device, the first or second information to the user equipment, the delivering causing the user equipment to report a measurement result to the first network device in response to a measurement event, and receiving the measurement result sent by the user equipment.

20 Claims, 7 Drawing Sheets

(56) References Cited

U.S. PATENT DOCUMENTS

| | | | |
|---|---|---|---|
| 10,264,568 | B2 | 4/2019 | Zhang et al. |
| 10,389,418 | B2 | 8/2019 | Kakishima et al. |
| 10,484,071 | B2 | 11/2019 | Nigam et al. |
| 2011/0105126 | A1 | 5/2011 | Liang et al. |
| 2011/0317577 | A1 | 12/2011 | Yamada et al. |
| 2013/0121185 | A1 | 5/2013 | Li et al. |
| 2014/0120926 | A1 | 5/2014 | Shin et al. |
| 2016/0309376 | A1 | 10/2016 | Liu et al. |
| 2016/0337916 | A1 | 11/2016 | Deenoo et al. |
| 2016/0353510 | A1 | 12/2016 | Zhang et al. |
| 2017/0195033 | A1 | 7/2017 | Zhang et al. |
| 2017/0324459 | A1* | 11/2017 | Koskela ............... H04B 7/0617 |
| 2017/0373731 | A1 | 12/2017 | Guo et al. |
| 2018/0006770 | A1 | 1/2018 | Guo et al. |
| 2018/0007577 | A1 | 1/2018 | Guo et al. |
| 2018/0013481 | A1 | 1/2018 | Guo et al. |
| 2018/0014208 | A1 | 1/2018 | Guo et al. |
| 2018/0027585 | A1 | 1/2018 | Guo et al. |
| 2018/0034515 | A1 | 2/2018 | Guo et al. |
| 2018/0048375 | A1* | 2/2018 | Guo ....................... H04B 7/024 |
| 2018/0084546 | A1 | 3/2018 | Guo et al. |
| 2018/0123675 | A1 | 5/2018 | Shi et al. |
| 2018/0359790 | A1 | 12/2018 | Ingale et al. |
| 2019/0141555 | A1 | 5/2019 | Tooher et al. |
| 2019/0174346 | A1 | 6/2019 | Murray et al. |
| 2019/0221291 | A1* | 7/2019 | Grisham ............... G16C 20/30 |
| 2019/0253115 | A1 | 8/2019 | Park et al. |
| 2019/0319686 | A1* | 10/2019 | Chen, IV ............ H04B 7/0628 |
| 2020/0120482 | A1 | 4/2020 | Parkvall et al. |

FOREIGN PATENT DOCUMENTS

| | | | |
|---|---|---|---|
| CN | 102026268 | A | 4/2011 |
| CN | 103167534 | A | 6/2013 |
| CN | 103428758 | A | 12/2013 |
| CN | 104115419 | A | 10/2014 |
| CN | 105009640 | A | 10/2015 |
| CN | 201610658401 | * | 1/2016 |
| CN | 105556869 | A | 5/2016 |
| CN | 105637939 | A | 6/2016 |
| CN | 105830483 | A | 8/2016 |
| EP | 2574095 | A1 | 3/2013 |
| JP | 2015185953 | A | 10/2015 |
| KR | 20130052670 | A | 5/2013 |
| KR | 20140113642 | A | 9/2014 |
| KR | 20160015821 | A | 2/2016 |
| WO | 2013069960 | A1 | 5/2013 |
| WO | 2015106237 | A1 | 7/2015 |
| WO | 2015109153 | A1 | 7/2015 |
| WO | 2016138873 | A1 | 9/2016 |

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 14)," 3GPP TS 36.331 V14.0.0, Sep. 2016, 644 pages.

"DL Based Measurement and Mobility," Agenda Item: 8.1.5.3, Source: Huawei, HiSilicon, Document for: Discussion and Decision, 3GPP TSG RAN WG1 Meeting #86bis, R1-1608849, Lisbon, Portugal, Oct. 10-14, 2016, 3 pages.

"Beam Management for Initial and Candidate Beam Discovery (BM P-1)," Source: Intel Corporation, Agenda item: 8.1.4.1, Document for: Discussion and Decision, 3GPP TSG-RAN WG1 #86bis, R1-1609516, Lisbon, Portugal, Oct. 10-14, 2016, 11 pages.

Author Unknown, Beam management in NR, Doc. No. R2-166588, pp. 1-4, Oct. 10, 2016 (Year: 2016).

Author Unknown, Intra-Cell and Inter-Cell Mobility in NR, Doc. No. R2-166769, pp. 1-3, Oct. 10, 2016 (Year. 2016).

Author Unknown, Measurement Configuration Reduction for Intra-NR Mobility, Doc. No. R2-166804, pp. 1-3, Oct. 10, 2016 (Year. 2016).

Author Unknown, Discussion on Beam Measurement and Tracking for 5G New Radio Interface in mmWave Frequency Bands, Doc No. R2-162226, pp. 1-5, Apr. 15, 2016 (Year: 2016).

"Measurement in NR," Agenda item: 9.5.1.1, Source: Intel Corporation, Document for: Discussion and Decision, 3GPP TSG RAN WG2 Meeting #94, R2-165015, Gothenburg, Sweden, Aug. 22-26, 2016, 7 pages.

"Mobility procedures in NR networks," Agenda Item: 9.5.1.1, Source: MediaTek Inc., Document for: Discussion and decision, 3GPP TSG-RAN WG2 Meeting #95, R2-165107, Gothenburg, Sweden, Aug. 22-26, 2016, 6 pages.

"Consideration on the Measurement for the NR," Agenda item: 9.5.1.1, Source: ZTE Corporation, ZTE Microelectronics, Document for: Discussion and Decision, 3GPP TSG-RAN WG2 Meeting #95, R2-165119, Göteborg, Sweden, Aug. 22-26, 2016, 4 pages.

"Measurements for Cell-level Mobility in High Frequency NR," Agenda Item: 9.5.1.1, Source: Samsung, Document for: Discussion/Decision, 3GPP TSG RAN WG2 #95, R2-165150, Göteborg, Sweden, Aug. 22-26, 2016, 4 pages.

Author Unknown, Discussion ofTRP related Issues in NR, Doc. No. R2-165171, pp. 1-7, Aug. 22, 2016 (Year: 2016).

Author Unknown, High Frequency NR RRC Mobility, Doc. No. R2-166100, pp. 1-7, Oct. 10, 2016 (Year: 2016).

"Evaluation of beam-based RRM Measurement," Agenda item: 9.3.1.1, Source: Samsung, Document for: Discussion & Decision, 3GPP TSG-RAN WG2 Meeting #95bis, R2-166101, Kaohsiung, Taiwan, Oct. 10-14, 2016, 5 pages.

Author Unknown, Mobility in NR CONNECTED-ACTIVE, Doc. No. R2-166151, pp. 1-5, Oct. 10, 2016 (Year: 2016).

"Consideration on the RRM Measurement for NR," Agenda item: 9.3.1.1, Source: ZTE, ZTE Microelectronics, Document for: Discussion and Decision, 3GPP TSG-RAN WG2 Meeting #95bis, R2-166337, Kaohsiung, October 10-14, 2016, 4 pages.

"RRM measurements and mobility control in RRC CONNECTED," Agenda Item: 5.1.1.1, Source: Ericsson, Document for: Discussion, Decision, 3GPP TSG-RAN WG2 #94, Tdoc R2-165540, Gothenburg, Sweden, May 22-26, 2016, 3 pages.

\* cited by examiner

MEASUREMENT REPORTING METHOD AND RELATED DEVICE

CROSS-REFERENCE TO RELATED APPLICATIONS

This application is a continuation of U.S. patent application Ser. No. 16/341,566, filed on Apr. 12, 2019, which is a national stage of International Application No. PCT/CN2016/101991, filed on Oct. 13, 2016. Both of the aforementioned applications are hereby incorporated by reference in their entireties.

TECHNICAL FIELD

The present invention relates to the communications field, and in particular, to a measurement reporting method and a related device.

BACKGROUND

With continuous development of communications technologies, conventional spectrum resources having frequencies below 3 GHz have been occupied, and in an existing radio access technology, a transmission rate has approached a Shannon capacity. Therefore, a research about using a millimeter wave for mobile communication has been carried out currently. In a millimeter wave system, a critical limitation is that a communication link between a millimeter wave transmission point and user equipment (UE) is easily blocked by a moving object. This is a result of an inherent feature of a millimeter wave, referred to as "connection vulnerability". To resolve this problem, the following method may be applied, including deploying a sufficient quantity of millimeter wave transmission and reception points (TRP), so that user equipment (UE) can spatially multiplex a plurality of TRPs at a same moment, and when a user turns or an orientation of a mobile phone changes, switching between serving beams is performed, so as to ensure communication quality of the millimeter wave. For example, at a higher frequency, one cell area may be covered by a plurality of narrow high-gain beams. Rotation patterns of different beams may overlap. There may be tens of beams to hundreds of beams, not only covering a horizontal direction but also covering a vertical direction. Because the rotation patterns of different beams overlap, and a radio environment (for example, a reflection surface and scattering) changes, a receiver may be located in a coverage area of a plurality of beams.

Because UE moves between narrow beams, even if a moving speed of the UE is very low, mobility of the UE may impose very large impact on communication links of different beams. A radio environment around the UE may also change relatively fast, and therefore the UE may perform communication by using a new beam, or some current communication beams may be suddenly blocked.

An existing long term evolution (LTE) specification defines a measurement event, used for processes such as determining quality of a serving cell and a neighboring cell, and triggering a handover. However, in a multiple connectivity scenario, UE may establish multi-link connectivity to different beams of a same TRP, or UE may establish multi-link connectivity to beams of different TRPs. Therefore, in a conventional method, a method for determining quality of a serving cell and a neighboring cell can no longer satisfy measurement in processes such as handover triggering when UE moves between different narrow beams.

SUMMARY

Embodiments of the present invention provide a measurement reporting method and a related device. The method is applied to a communications system, and the communications system may be a centimeter wave communications system or a millimeter wave communications system. The communications system includes a plurality of network devices and user equipments. The network device may be a macro base station, a base station to which a cell belongs, a transmission and reception point TRP to which a cell belongs, a micro base station, a small base station, a pico base station, a base station in future $5^{th}$ generation (5G), or the like. The network device may alternatively be a radio remote unit (RRU). The user equipment may be access user equipment, a subscriber unit, a subscriber station, a mobile station, a mobile console, a remote station, remote user equipment, a mobile device, a wireless communications device, a user agent, or a user apparatus. The access user equipment may be a cellular phone, a cordless telephone set, a Session Initiation Protocol (SIP) phone, a personal digital assistant (PDA), a handheld device having a wireless communication function, a computing device or another processing device connected to a wireless modem, an in-vehicle device, a wearable device, user equipment in a future 5G network, or the like.

According to a first aspect, an embodiment of the present invention provides a measurement reporting method, including configuring, by a first network device, first information and/or second information for user equipment UE, where the first information and/or the second information are or is measurement configuration information, the first information includes a first threshold and/or a second threshold, the first threshold is used to trigger a first type of measurement event, the second threshold is used to trigger a second type of measurement event, the second information is used to instruct the UE to report a first measurement result and/or a second measurement result, the first measurement result is a cell measurement result, and the second measurement result is a beam measurement result, and after the first network device configures the first information and/or the second information, delivering, by the first network device, the first information and/or the second information to the UE, so that the UE reports a measurement result to the first network device when a measurement event is satisfied. The first network device may be a primary TRP, or may be a secondary TRP, or a primary cell on a TRP. In this embodiment of the present invention, the first network device configures different types of measurement events, and configures different thresholds based on the different types of measurement events, and/or configures the second information, where the second information is used to instruct the UE to report different types of measurement results. This fully considers a characteristic of high-gain beam coverage in a dense network or an ultra-dense network, and for mobility of the user equipment, better adapts to beam measurement and better adapts to measurement reporting in a future 5G network.

In a possible implementation, the first type is a cell change, cell switching, or a cell handover, and the second type is a beam change or beam switching. The cell change may refer to adding or modifying a secondary cell. In this embodiment of the present invention, thresholds are configured for measurement events based on types. For mobility of the user equipment, the cell change is considered in a macro sense, and configurations of beam measurement events are also considered in a micro sense, thereby reducing complexity of a reported result.

In a possible implementation, the first type is used between a group of network devices, to be specific, between a network device group to which the first network device belongs and a network device group to which a second network device belongs.

In a possible implementation, the second type is used in a network device group or in a network device, to be specific, between different network devices in a network device group to which the first network device belongs, or between different beams in the first network device.

In a possible implementation, the first information further includes a third threshold, and the third threshold is used to trigger a third type of measurement event, the second type is used in a group of network devices, to be specific, between different network devices in a network device group to which the first network device belongs, and the third type is used in a network device, to be specific, between different beams in the first network device. The first type is used between a group of network devices, to be specific, between a network device group to which the first network device belongs and a network device group to which a second network device belongs. The second type is used in a network device group or in a network device, to be specific, between different network devices in a network device group to which the first network device belongs. The third type may be used in a network device, to be specific, between different beams in the first network device.

In a possible implementation, the first type of measurement event is a measurement result of a first beam is inferior to the first threshold, and/or a measurement result of a second beam is superior to the first threshold, and/or the measurement result of the second beam is superior to that of the first beam by a first offset value, and the second type of measurement event is the measurement result of the first beam is inferior to the second threshold, and/or a measurement result of a third beam is superior to the second threshold, and/or the measurement result of the third beam is superior to that of the first beam link by a second offset value. The third type of measurement event is a measurement result of a first beam is inferior to the third threshold, and/or a measurement result of a fourth beam is superior to the third threshold, and/or the measurement result of the fourth beam is superior to that of the first beam by a third offset value. The first beam is a beam that is in the first network device and that is used to communicate with the UE. The second beam does not belong to the first network device, and a network device to which the second beam belongs and the first network device belong to different network device groups. The third beam does not belong to the first network device, but a network device to which the third beam belongs and the first network device belong to a same network device group. Both the fourth beam and the first beam belong to the first network device, but the fourth beam is different from the first beam. At least one of the second beam, the third beam, and the fourth beam may be referred to as a target beam. In this embodiment of the present invention, for different layers, for example, a layer 1 between network device groups, a layer 2 between different network devices in a network device group, and a layer 3 in a network device, different types of measurement events are configured, and different thresholds are configured based on the different types of measurement events. Therefore, the UE may separately report measurement reports based on different event configurations, and a network implements different operations for a beam, a network device, and a network device group, thereby adapting to management of radio resources in a centimeter-level or millimeter wave system or a future ultra-dense network.

In a possible implementation, when the measurement event is specific to cell-level mobility, to ensure reliability of information transmission, information needs to be transmitted by using signaling at a radio resource control (RRC) level. In this way, reliability of multiple connectivity can be limited by using a quantity of links. Therefore, a configuration of the first information further includes a quantity of first beams and/or a quantity of target beams, and the target beam is at least one of the second beam, the third beam, or the fourth beam. The cell-level mobility usually refers to mobile measurement and reporting between transmission and reception point groups (TRPGs).

In a possible implementation, a quantity of links in multiple connectivity in a target cell may be configured to be greater than a threshold, to ensure that there are a sufficient quantity of links in multiple connectivity in the target cell. A quantity of links in multiple connectivity in a source cell may be configured to be less than a threshold, to indicate relatively poor reliability of multiple connectivity in the source cell. The measurement event further includes at least one of the following, including a measurement result of the first beam is inferior to a fourth threshold, and/or a quantity of connection beams in the first network device is less than a fifth threshold, and a measurement result of the target beam is superior to a sixth threshold, and/or the quantity of target beams is greater than a seventh threshold.

In a possible implementation, the measurement event specifically includes at least one of the following, including the measurement result of the first beam is inferior to the fourth threshold, and/or the quantity of first beams is less than the fifth threshold, the measurement result of the target beam is superior to, by a fourth offset value, the beam measurement result of the first beam of the first network device or a cell measurement result of the first network device, and/or the quantity of target beams is greater than the seventh threshold, the measurement result of the target beam is superior to the sixth threshold, and/or the quantity of target beams is greater than the seventh threshold, a beam or cell measurement result of the first network device is inferior to the fourth threshold, the measurement result of the target beam is superior to the seventh threshold, and/or the quantity of target beams is greater than the seventh threshold, and the measurement result of the target beam is superior to, by a fourth offset value, a beam or cell measurement result of a secondary cell of the first network device, and/or the quantity of target beams is greater than the seventh threshold. The measurement result of the target beam may be a beam measurement result of the target beam, or a cell measurement result of a network device to which the target beam belongs. In this embodiment of the present invention, a reporting condition, namely, a quantity of links in multiple connectivity, is further set in the measurement event. Especially in cell-level mobility measurement, a quantity of links in multiple connectivity of a serving cell and a neighboring cell is considered, improving reliability for measuring cell quality. This can significantly reduce a risk of a handover to an unsuitable cell or a ping-pong handover, and reduce RRC signaling overheads caused by an improper handover.

In a possible implementation, the second information is further used to instruct the UE to report the first measurement result or the second measurement result to a target network device based on a second beam, or the second information may further instruct the UE to report the second measurement result based on at least one of a first beam, a third beam, and a fourth beam, or instruct the UE to report the first measurement result based on a cell measurement result that is obtained by using at least one of a first beam, a third beam, and a fourth beam. Measurement results are reported based on types. This fully considers a beam measurement result and reduces complexity of processing a reported result by a network device. Further, it may be set that the first measurement result is reported to a macro base station, and the first measurement result and/or the second measurement result are or is reported to the first network device, so that the macro base station and the network device may separately process different measurement results, to improve measurement result processing efficiency.

In a possible implementation, the foregoing reliability configuration that a quantity of beams obtained through measurement satisfies a requirement may be used together with the first threshold and/or the second threshold.

In a possible implementation, the second information may further instruct the UE to make a comparison for a beam measurement result or for a cell measurement result.

In a possible implementation, the second information may further instruct to make a one-to-one corresponding comparison between target beams and reference beams, where the one-to-one corresponding comparison may be a corresponding comparison in ascending or descending order of measurement signal strength values. In a possible implementation, the second information may further instruct to compare a target beam with one beam or N beams having best signal strength in reference beams, where N is a positive integer greater than or equal to 2. In a possible implementation, the second information may further instruct to compare a target beam with a beam in reference beams that is selected according to a rule. The rule may be comparing a target-cell measurement result obtained through filtering or conversion of a beam measurement result of a target beam with a cell measurement result of a cell to which a reference beam belongs, or comparing a target-cell measurement result obtained through filtering or conversion of a beam measurement result of a target beam with a beam measurement result of a reference beam, or comparing a beam measurement result of a target beam with a beam or cell measurement result of a reference beam, or the like. When the target beam is the second beam, the reference beam may be at least one of the first beam, the third beam, and the fourth beam, when the target beam is the third beam, the reference beam may be at least one of the first beam and the fourth beam, or when the target beam is the fourth beam, the reference beam may be the first beam. The cell measurement result may be implemented in various manners, for example, may be a beam measurement result of a beam having best signal strength, or a linear or non-linear average value of beam measurement results of N beams having best signal strength.

In a possible implementation, it may be configured by the network device in the second information that the user equipment triggers measurement reporting periodically or based on an event. The event-based triggering may be triggering performed based on an event configured on a network side, or performed by the user equipment based on a requirement of the user equipment.

In a possible implementation, it may be configured by the network device that the user equipment reports a fifth beam set, and the network side determines a sixth beam set. The fifth beam set is a candidate beam set satisfying a measurement event, and the sixth beam set is a communication beam set, a connection beam set, or a serving beam set. The sixth beam set is a subset of the fifth beam set. The first beam belongs to the sixth beam set.

In a possible implementation, the first information and/or the second information are or is delivered by using at least one of physical layer signaling, Media Access Control (MAC) layer signaling, or radio resource control RRC layer signaling.

In a possible implementation, the first measurement result is reported by using RRC layer signaling, physical layer signaling, or MAC layer signaling, and the second measurement result is reported by using physical layer signaling or MAC layer signaling.

In a possible implementation, the target network device is a macro base station, the first network device, or a network device indicated in a measurement object.

In a possible implementation, the second information further includes at least one of a measurement granularity, a measurement offset, a measurement lag, a method for filtering different measurement results, a network device identifier or a beam identifier or a beam pair identifier that can be measured, and a feedback resource used for performing a feedback, and the different measurement results are beam measurement results, or cell measurement results obtained based on beam measurement results.

In a possible implementation, the measurement result includes at least one of beam signal strength obtained through measurement, cell signal strength obtained through measurement or deduction, a network device identifier, a beam identifier, and a beam pair identifier.

In a possible implementation, the cell signal strength is reference signal received power (RSRP) and/or reference signal received quality (RSRQ) at a layer 1, or RSRP and/or RSRQ obtained after filtering at a layer 2 or a layer 3.

In a possible implementation, the second information further includes a measurement object list, the measurement object list is used to instruct the UE to measure a first measurement object in the measurement list, and the first measurement object is some of measurement objects. The first network device may configure the measurement object list, so that the UE measures the measurement objects in the measurement object list, to reduce blind detection on the measurement objects.

In a possible implementation, identifiers are used to distinguish between different measurement tasks, and are configured over a network. Each measurement identifier corresponds to a unique measurement object and a unique group of reporting configurations. When the network performs configuration, to reduce air interface overheads, the network does not directly describe, in a measurement identifier, specific content of a measurement object and a reporting configuration that correspond to the measurement identifier, but gives only a measurement object identifier and a reporting configuration identifier that correspond to the measurement task. The measurement object is at least one of a network device identifier, a frequency identifier, a beam identifier, a network device group identifier, a frequency group identifier, a beam group identifier, a reference signal implicitly corresponding to a network device identifier, or a reference signal implicitly corresponding to a beam identifier.

In a possible implementation, the measurement object is configured based on capability information fed back by the UE, and the capability information is information indicating that the UE supports single connectivity, dual connectivity, or multiple connectivity, or that the UE supports a single beam or a plurality of beams, so that radio resource management of the user equipment adapts to more application scenarios.

In a possible implementation, the first network device is a first base station, a first transmission and reception point TRP, a base station to which a first cell belongs, or a transmission and reception point TRP to which a first cell belongs, the first cell is an entity cell, and the first base station is a macro base station or a small cell base station.

In a possible implementation, the network device group includes a plurality of network devices having correlation or a plurality of virtual or super cells having correlation, the virtual or super cell includes one or more TRPs, and the correlation is a relationship of adjacency or a relationship of belonging to a same type according to a predefined rule.

According to a second aspect, an embodiment of the present invention provides a computer storage medium, configured to store a computer software instruction used by the foregoing network device. The computer software instruction includes a program designed to perform the foregoing first aspect.

According to a third aspect, an embodiment of the present invention provides a network device having a function actually performed by a network server in the foregoing method. The function may be implemented by hardware, or may be implemented by hardware executing corresponding software. The hardware or software includes one or more modules corresponding to the foregoing function.

According to a fourth aspect, a structure of a network device includes a memory, a transceiver, and a processor. The memory is configured to store computer executable program code, and is coupled to the transceiver. The program code includes an instruction, and when the processor executes the instruction, the instruction enables the network device to execute information or an instruction in the foregoing method.

According to a fifth aspect, an embodiment of the present invention further provides a measurement reporting method, including receiving, by user equipment, first information and/or second information sent by a first network device, where the first information includes a first threshold and/or a second threshold, the first threshold is used to trigger a first type of measurement event, and the second threshold is used to trigger a second type of measurement event, performing, by the UE, measurement based on the first information and/or the second information, and when a measurement event is satisfied, reporting, by the UE, a first measurement result and/or a second measurement result based on the second information, where the first measurement result is a cell measurement result, and the second measurement result is a beam measurement result.

In a possible implementation, the first type is a cell change, cell switching, or a cell handover, and the second type is a beam change or beam switching.

In a possible implementation, the first type is used between a group of network devices, to be specific, between a network device group to which the first network device belongs and a network device group to which a second network device belongs.

In a possible implementation, the second type is used in a network device group or in a network device, to be specific, between different network devices in a network device group to which the first network device belongs, or between different beams in the first network device.

In a possible implementation, the first information further includes a third threshold, and the third threshold is used to trigger a third type of measurement event, the second type is used in a group of network devices, to be specific, between different network devices in a network device group to which the first network device belongs, and the third type is used in a network device, to be specific, between different beams in the first network device.

In a possible implementation, the first type of measurement event is a measurement result of a first beam is inferior to the first threshold, and/or a measurement result of a second beam is superior to the first threshold, and/or the measurement result of the second beam is superior to that of the first beam by a first offset value, and the second type of measurement event is the measurement result of the first beam is inferior to the second threshold, and/or a measurement result of a third beam is superior to the second threshold, and/or the measurement result of the third beam is superior to that of the first beam link by a second offset value.

In a possible implementation, the third type of measurement event is a measurement result of a first beam is inferior to the third threshold, and/or a measurement result of a fourth beam is superior to the third threshold, and/or the measurement result of the fourth beam is superior to that of the first beam by a third offset value.

In a possible implementation, the first information further includes a quantity of first beams and a quantity of target beams, and the target beam is at least one of a second beam, a third beam, or a fourth beam.

In a possible implementation, the measurement event further includes at least one of the following, including a measurement result of the first beam is inferior to a fourth threshold, and/or a quantity of connection beams in the first network device is less than a fifth threshold, and a measurement result of the target beam is superior to a sixth threshold, and/or the quantity of target beams is greater than a seventh threshold.

In a possible implementation, the measurement event specifically includes at least one of the following, including the measurement result of the first beam is inferior to the fourth threshold, and/or the quantity of first beams is less than the fifth threshold, the measurement result of the target beam is superior to, by a fourth offset value, the measurement result of the first beam of the first network device or a cell measurement result of the first network device, and/or the quantity of target beams is greater than the seventh threshold, the measurement result of the target beam is superior to the sixth threshold, and/or the quantity of target beams is greater than the seventh threshold, a beam or cell measurement result of the first network device is inferior to the fourth threshold, and/or the measurement result of the target beam is superior to the seventh threshold, and/or the quantity of target beams is greater than the seventh threshold, and the measurement result of the target beam is superior to, by a fourth offset value, a beam or cell measurement result of a secondary cell of the first network device, and/or the quantity of target beams is greater than the seventh threshold.

In a possible implementation, the second information is further used to instruct the UE to report the first measurement result to a target network device based on a second beam, or instruct the UE to report the second measurement result based on a first beam and/or a third beam and/or a fourth beam, or instruct the UE to report the first measurement result based on a cell measurement result that is obtained by using a first beam and/or a third beam and/or a fourth beam.

In a possible implementation, the first beam is a beam that is in the first network device and that is used to communicate with the UE, the second beam does not belong to the first network device, and a network device to which the second beam belongs and the first network device belong to different network device groups, and the third beam does not belong to the first network device, but a network device to which the third beam belongs and the first network device belong to a same network device group.

In a possible implementation, the first beam is a beam that is in the first network device and that is used to communicate with the UE, and both the fourth beam and the first beam belong to the first network device, but the fourth beam is different from the first beam.

In a possible implementation, alternatively, a specific method for performing, by the user equipment, measurement based on the second information may be making, by the user equipment, a comparison for a beam measurement result or for a cell measurement result based on the second information. The first measurement result is reported by using RRC layer signaling, physical layer signaling, or MAC layer signaling, and the second measurement result is reported by using physical layer signaling or MAC layer signaling.

In a possible implementation, the second information further includes at least one of a measurement granularity, a measurement offset, a measurement lag, a method for filtering different measurement results, a network device identifier or a beam identifier or a beam pair identifier that needs to be measured, and a feedback resource used for performing a feedback, and the different measurement results are measurement results specific to beam or cell types.

In a possible implementation, the measurement result includes at least one of beam signal strength obtained through measurement, cell signal strength obtained through measurement or deduction, a network device identifier, a beam identifier, and a beam pair identifier.

In a possible implementation, the cell signal strength is reference signal received power (RSRP) and/or reference signal received quality (RSRQ) at a layer 1, or RSRP and/or RSRQ obtained after filtering at a layer 2 or a layer 3.

In a possible implementation, the second information further includes a measurement object list, and the measurement object list is used to instruct the user equipment to measure a first measurement object in the measurement list.

In a possible implementation, the measurement object is at least one of a network device identifier, a frequency identifier, a beam identifier, a network device group identifier, a frequency group identifier, a beam group identifier, a reference signal implicitly corresponding to a network device identifier, or a reference signal implicitly corresponding to a beam identifier.

In a possible implementation, the measurement object is configured based on capability information fed back by the user equipment, and the capability information is information indicating that the user equipment supports single connectivity, dual connectivity, or multiple connectivity, or that the user equipment supports a single beam or a plurality of beams.

DETAILED DESCRIPTION OF ILLUSTRATIVE EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by persons skilled in the art based on the embodiments of the present invention without creative efforts shall fall within the protection scope of the present invention.

In the specification, claims, and accompanying drawings of the present invention, the terms "first", "second", "third", "fourth", and so on (if they exist) are intended to distinguish between similar objects but do not necessarily indicate a specific order or sequence. It should be understood that the data termed in such a way is interchangeable in proper circumstances so that the embodiments described herein can be implemented in other orders different from the order illustrated or described herein. In addition, the terms "include" and "have" and any variants thereof are intended to cover a non-exclusive inclusion. For example, a process, a method, a system, a product, or a device that includes a series of steps or units is not necessarily limited to those expressly listed steps or units, but may include other steps or units that are not expressly listed or inherent to such a process, a method, a system, a product, or a device.

Figure 1:
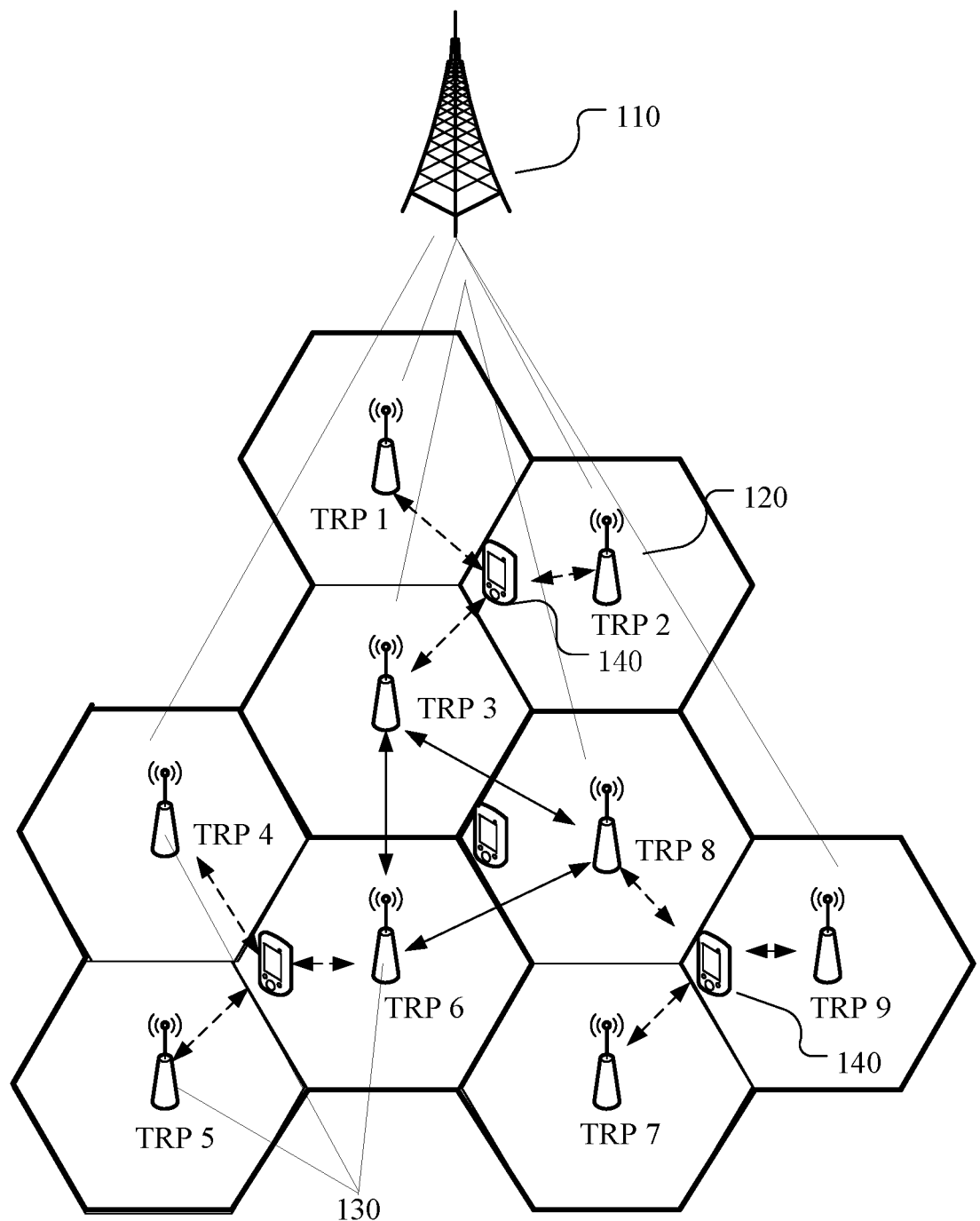
FIG. 1 is a schematic architectural diagram of a communications system according to an embodiment of the present invention.

The embodiments of the present invention provide a measurement reporting method. The method is applied to a communications system, and the communications system may be a centimeter wave communications system or a millimeter wave communications system. FIG. 1 is a schematic architectural diagram of a communications system 100 according to an embodiment of the present invention. The communications system includes a macro base station no. The macro base station no includes a plurality of cells. Each cell includes one or more network devices 120. When each cell includes a plurality of network devices 120, the plurality of network devices are referred to as a network device group 13o, or it may be understood that a network device group 130 includes a plurality of network devices 120. A signal coverage area of the network device group 130 is one cell, and a signal coverage area of one network device 120 may be one small cell. The network device 120 may be a transmission and reception point (TRP), namely, a node for transmitting information and receiving information. The TRP is a physical node, and a plurality of antenna units are configured for the physical node. Different transmission and reception points are geographically separated, or may be divided into sectors. The network device group 130 may be a transmission and reception point group (TRPG). The network device may alternatively be a macro base station, a base station to which a cell belongs, a transmission and reception point (TRP) to which a cell belongs, a micro base station, a small base station, a pico base station, a base station in future 5G, or the like. The network device may alternatively be a radio remote unit (RRU). A radio frequency module in a base station is connected to a remote radio frequency unit by using an optical fiber, and the remote radio frequency unit is disposed on a station determined through network planning.

As shown in FIG. 1, in this embodiment of the present invention, the network device is described by using a TRP as an example. For example, a TRPG 1, namely, a first network device group, includes a TRP 1, a TRP 2, and a TRP 3, a TRPG 2, namely, a second network device group, includes a TRP 4, a TRP 5, and a TRP 6, and a TRPG 3, namely, a third network device group, includes a TRP 7, a TRP 8, and a TRP 9. The network device group includes a plurality of network devices having correlation or a plurality of virtual or super cells having correlation. The virtual or super cell includes one or more TRPs. The correlation is a relationship of adjacency or a relationship of belonging to a same type according to a predefined rule. It should be noted that a quantity of network devices and a quantity of network devices included in a network device group are examples merely for convenience of description, but do not constitute a limitation to the present invention.

Figure 2:
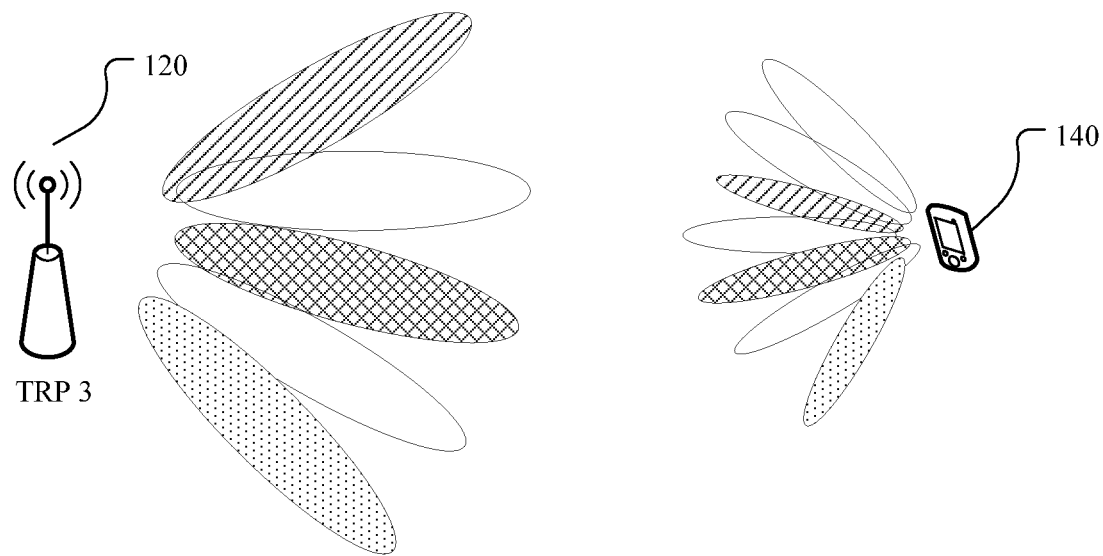
FIG. 2 is a schematic diagram of a scenario of beam transmission between user equipment and one network device according to an embodiment of the present invention.
Figure 3:
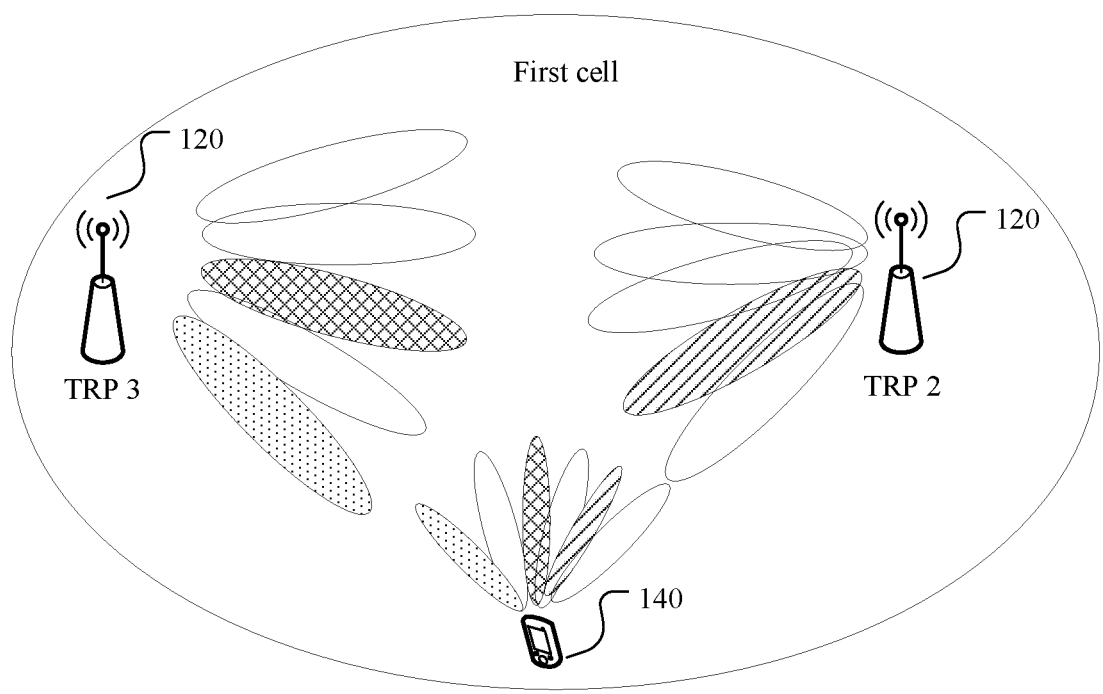
FIG. 3 is a schematic diagram of a scenario of beam connectivity between user equipment and different network devices in a network device group according to an embodiment of the present invention.
Figure 4:
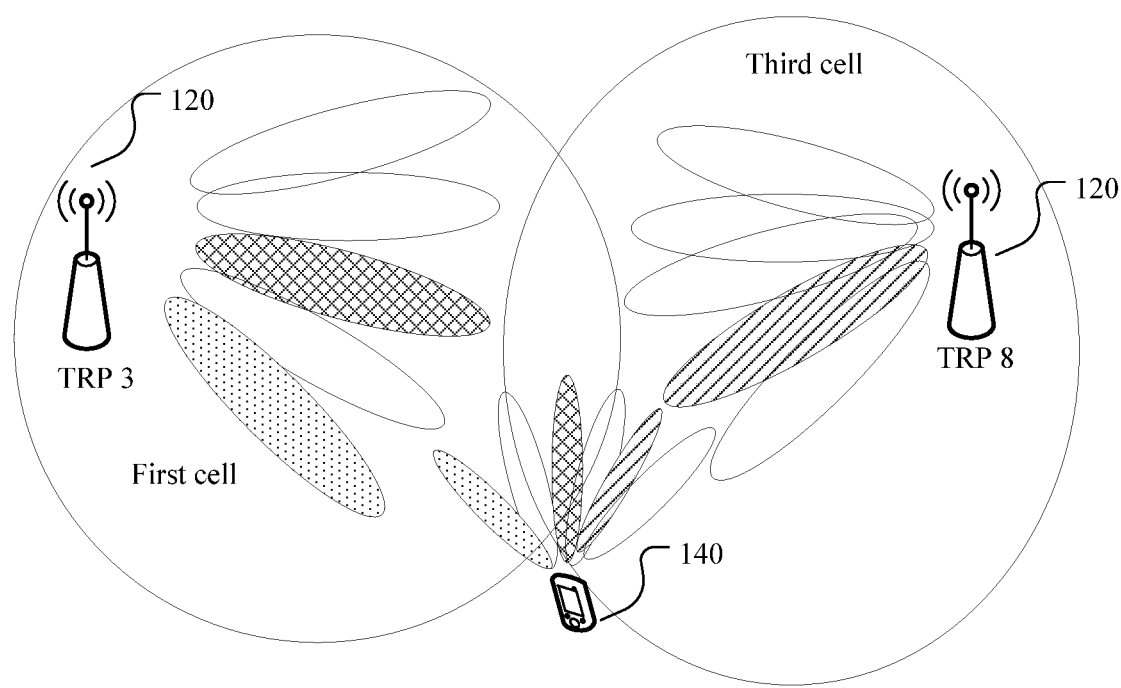
FIG. 4 is a schematic diagram of a scenario of connectivity between user equipment and network devices belonging to different network device groups according to an embodiment of the present invention.

One cell or small cell area may be covered by a plurality of narrow high-gain beams (beam). Rotation patterns of different beams may overlap, so as to provide stable coverage for, for example, a common control channel in an entire cell area. There may be tens of beams to hundreds of beams, not only covering a horizontal direction but also covering a vertical direction. When user equipment 140 moves in a cell and between cells, the user equipment may support at least two beams. When the user equipment is capable of supporting a plurality of sending and receiving beams, the user equipment may be connected to a same TRP, or different TRPs in a same TRPG, or different TRPs belonging to different TRPGs. This may be understood with reference to FIG. 1 to FIG. 4. FIG. 2 is a schematic diagram of a scenario of beam connectivity between user equipment and one network device. FIG. 3 is a schematic diagram of a scenario of beam connectivity between user equipment and different network devices in a network device group. FIG. 4 is a schematic diagram of a scenario of connectivity between user equipment and network devices belonging to different network device groups. It should be noted that the user equipment may communicate with one or more core networks through a radio access network (RAN), and the user equipment (UE) may be access user equipment, a subscriber unit, a subscriber station, a mobile station, a mobile console, a remote station, remote user equipment, a mobile device, a wireless communications device, a user agent, or a user apparatus. The access user equipment may be a cellular phone, a cordless telephone set, a Session Initiation Protocol (SIP) phone, a personal digital assistant (PDA), a handheld device having a wireless communication function, a computing device or another processing device connected to a wireless modem, an in-vehicle device, a wearable device, user equipment in a future 5G network, or the like.

Figure 5:
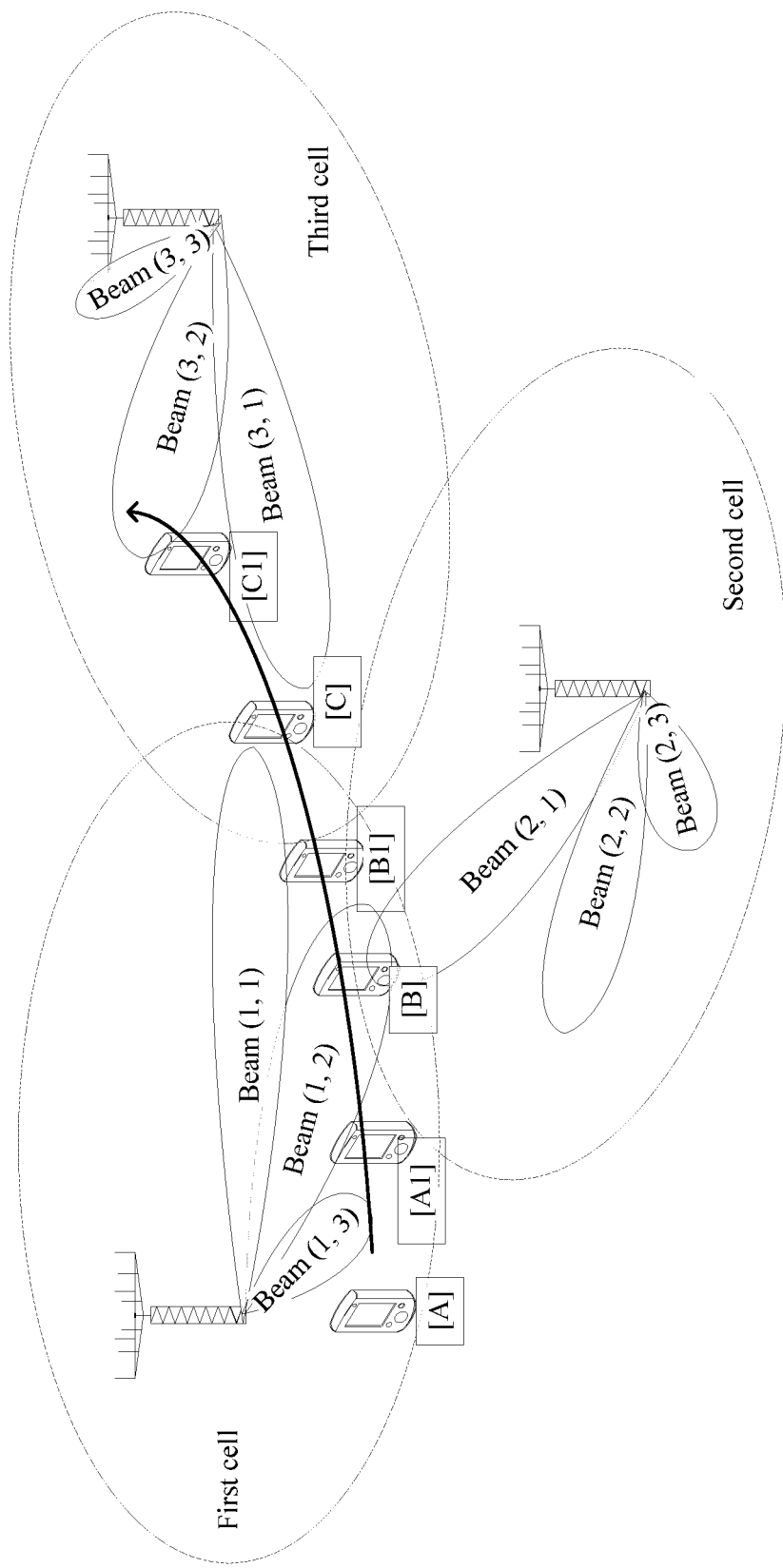
FIG. 5 is a schematic diagram of a scenario of a moving process of user equipment according to an embodiment of the present invention.

A handover process is usually triggered by comparison of measurement events of a serving cell and a neighboring cell. When a plurality of beams are considered for the serving cell and the neighboring cell, the comparison between the serving cell and the neighboring cell becomes more complex. FIG. 5 is a schematic diagram of a scenario of a moving process of user equipment. In a process in which the user equipment moves from a position A to a position A1, and from the position A1 to a position B, until moving to a position C1, for detected different beams, the user equipment may detect a cell identifier and a beam identifier. For example, a beam (1, 1) in FIG. 5 indicates that the beam is a beam identified as 1 in a first cell. When the UE moves from the first cell to a third cell, the UE may detect four beams in each cell. If there are a plurality of beams, the plurality of beams need to be considered when the UE performs measurement.

Figure 6:
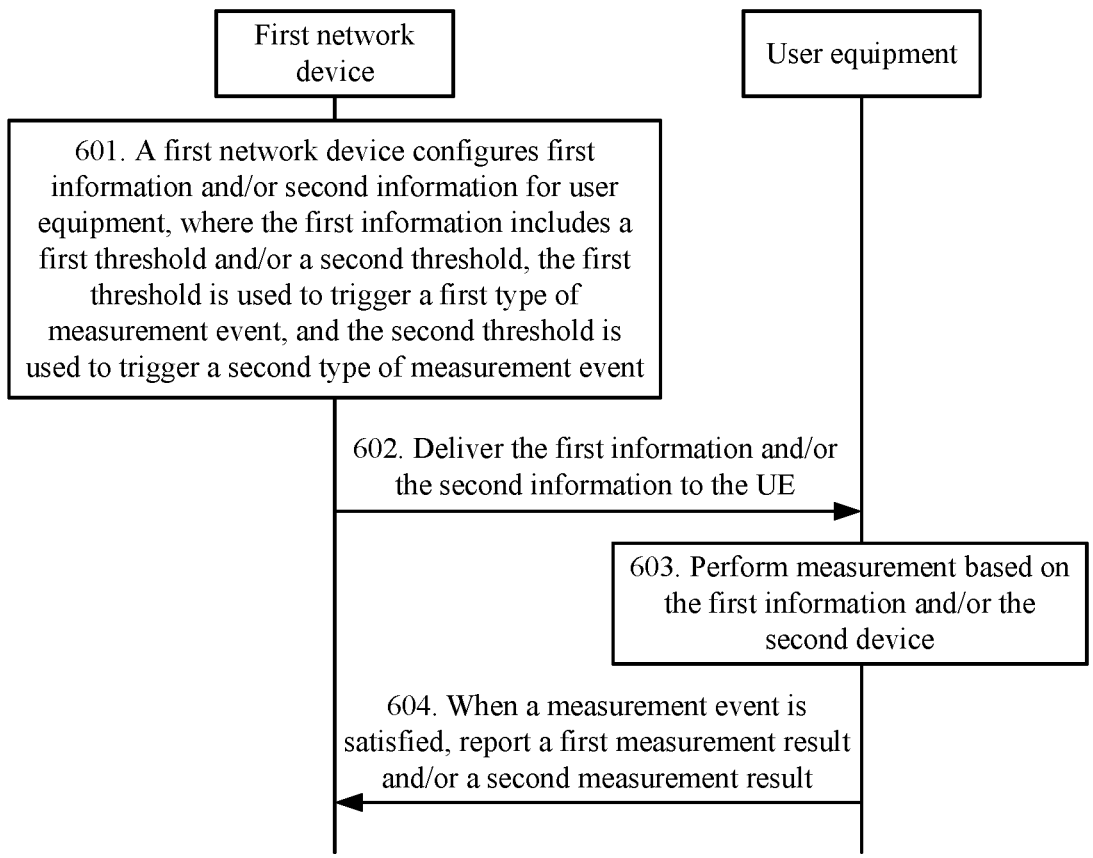
FIG. 6 is a schematic flowchart of an embodiment of a measurement reporting method according to an embodiment of the present invention.

Referring to FIG. 6, the following describes in detail an embodiment of the measurement reporting method provided in the present invention.

Step 601: A first network device configures first information and/or second information for user equipment UE, where the first information includes a first threshold and/or a second threshold, the first threshold is used to trigger a first type of measurement event, and the second threshold is used to trigger a second type of measurement event.

The first network device may be a primary TRP, or may be a secondary TRP, or a primary cell on a TRP. Both the primary TRP and the secondary TRP are service TRPs of the user equipment. The primary TRP is a TRP that is first connected to the user equipment among TRPs connected to the user equipment.

A reporting configuration command may be used to guide the UE to perform measurement. The reporting configuration command guides the UE to perform measurement and reporting in a manner of triggering reporting only when a specific condition is satisfied. In this embodiment of the present invention, a triggering type is event-triggered reporting, and a measurement event and a related threshold need to be configured for the event-triggered reporting.

The following separately describes related configuration content of measurement events and related thresholds.

1. Configurations of Different Thresholds for Different Types of Measurement Events In a first possible implementation, the first type is a cell change, cell switching, or a cell handover, and the second type is a beam change or beam switching.

In a second possible implementation, (1) the first type is used between a group of network devices, to be specific, between a network device group to which the first network device belongs and a network device group to which a second network device belongs, for example, between a beam in a TRP 1 in a TRPG 1 and a beam in a TRP 8 in a TRPG 3 with reference to FIG. 1 and FIG. 5 for understanding, (2) the second type is used in a network device group or in a network device, to be specific, between different network devices in a network device group to which the first network device belongs, for example, between a beam in the TRP 1 in the TRPG 1 and a beam in a TRP 2 in the TRPG 1, or between different beams in the first network device, for example, between beams in the TRP 1.

In a third possible implementation, the first information further includes a third threshold, and the third threshold is used to trigger a third type of measurement event. (1) The first type is used between a group of network devices, to be specific, between a network device group to which the first network device belongs and a network device group to which a second network device belongs. (2) The second type is used in a network device group or in a network device, to be specific, between different network devices in a network device group to which the first network device belongs. (3) The third type is used in a network device, to be specific, between different beams in the first network device.

Figure 7:
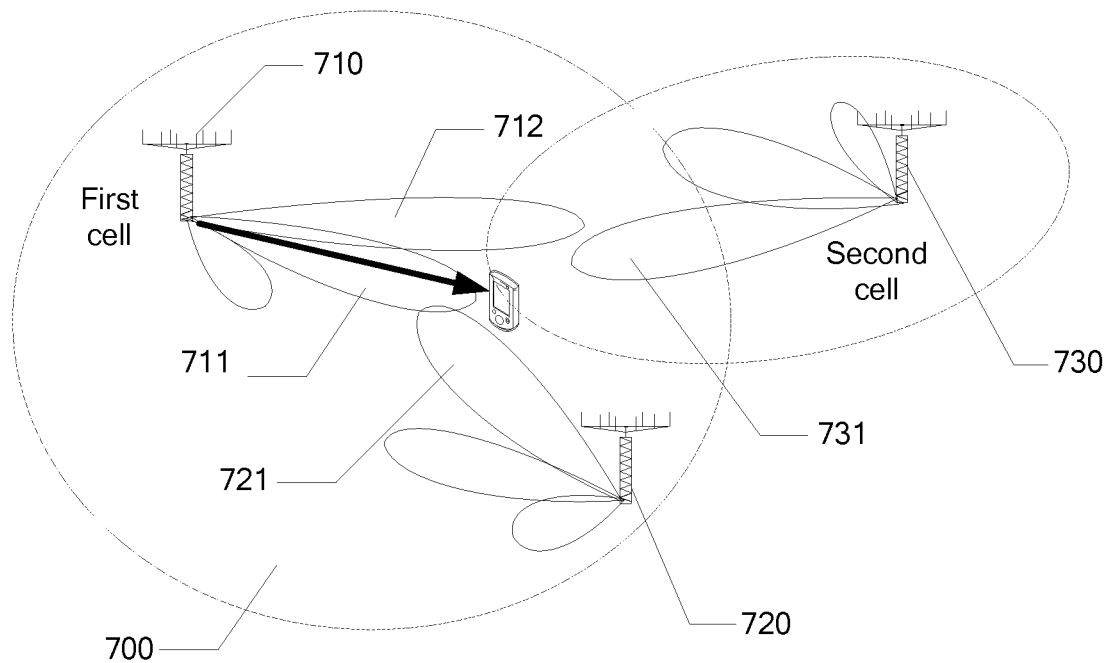
FIG. 7 is a schematic diagram of different types of beams according to an embodiment of the present invention.

In this embodiment of the present invention, the third possible implementation may be used as an example to specifically describe a configuration for each type of measurement event. When the user equipment detects beams, four types of beams are included. This may be understood with reference to FIG. 7. FIG. 7 is a schematic diagram of different types of beams. The four types of beams are a first beam 711, namely, a beam that is in a first network device 710 and that is used to communicate with the UE, a second beam 731, namely, a beam that does not belong to the first network device 710, where a network device 730 to which the second beam 731 belongs and the first network device 710 belong to different network device groups, a third beam 721, namely, a beam that does not belong to the first network device 710, where a network device 720 to which the third beam 721 belongs and the first network device belong to a same network device group 700, and a fourth beam 712, where both the fourth beam and the first beam belong to the first network device 710, and the fourth beam is different from the first beam.

The first type of measurement event is a measurement result of the first beam 711 is inferior to the first threshold, and/or a measurement result of the second beam 731 is superior to the first threshold, and/or the measurement result of the second beam 731 is superior to that of the first beam 711 by a first offset value.

The second type of measurement event is the measurement result of the first beam 711 is inferior to the second threshold, and/or a measurement result of the third beam 721 is superior to the second threshold, and/or the measurement result of the third beam 721 is superior to that of the first beam 711 by a second offset value.

The third type of measurement event is the measurement result of the first beam 711 is inferior to the third threshold, and/or a measurement result of the fourth beam 712 is superior to the third threshold, and/or the measurement result of the fourth beam 712 is superior to that of the first beam 711 by a third offset value.

Preferably, the first threshold is greater than the second threshold, and the second threshold is greater than or equal to the third threshold.

In this embodiment of the present invention, for different layers, for example, a layer 1 between TRPGs, a layer 2 between different TRPs in a TRPG, and a layer 3 in a TRP, different types of measurement events are configured, and different thresholds are configured for the different types of measurement events. For a mobility measurement configuration between TRPGs (at the layer 1), a relatively high threshold needs to be configured, because such cell-level mobility requires transferring by using RRC signaling. Herein, in addition to a beam measurement result, a cell measurement result also needs to be considered. For a mobility measurement configuration in a TRPG (at the layer 2), a relatively low threshold needs to be configured, because such beam-level mobility does not require transferring by using RRC signaling. Herein, only a beam measurement result is considered, and a cell measurement result is not required. Likewise, a mobility measurement configuration in a TRP (at the layer 3) does not require transferring by using RRC signaling, and a relatively low threshold may also be configured. Beam switching in a TRP requires a lower reporting threshold than beam switching between TRPs.

Further, redefined measurement events may be as follows.

A neighboring beam in a TRP or a TRPG is superior to a beam in a primary cell (PCell) by an offset value (offset 1), and a neighboring beam between TRPGs is superior to the PCell by an offset value (offset 2).

A neighboring beam in a TRP or a TRPG is superior to a beam in a secondary cell (SCell) by an offset value (offset 1'), and a neighboring beam between TRPGs is superior to the SCell by an offset value (offset 2').

Optionally, in another possible implementation, a threshold in the first information may be dynamically adjusted by the first network device. Therefore, the first network device may control a configuration of the threshold, so that the UE reports only a best beam or beam pair, or may control a configuration of the threshold, so that the UE reports N best beams or N best beam pairs. N is a positive integer greater than or equal to 1. A beam pair may be understood as a beam combination, namely, a combination of a sending beam and a receiving beam. The sending beam is a sending beam of a TRP, and the receiving beam is a receiving beam of the UE. In addition, if uplink measurement is performed, the sending beam is a sending beam of the UE, and the receiving beam is a receiving beam of the TRP.

In another possible implementation, the first network device configures the first information, and the first information may indicate that the first network device directly configures the UE to report a best beam or beam pair, or report N best beams or N best beam pairs.

In this embodiment of the present invention, different thresholds are set for different types of measurement events, so that the UE may separately report measurement reports based on different event configurations, and a network implements different operations for a beam, a network device, and a network device group, such as operations of adding, deleting, and switching a radio resource, thereby adapting to management of radio resources in a millimeter wave system.

2. Configurations of Measurement Events and Related Thresholds for Cell-Level Mobility When a measurement event is specific to beam-level mobility, information may be transmitted between the first network device and the user equipment by using signaling at a Media Access Control (MAC) level or a physical layer (PHY) level. When a measurement event is specific to cell-level mobility (for example, a handover between different TRPGs), to ensure reliability of information transmission, information needs to be transmitted by using signaling at a radio resource control (RRC) level. In this way, reliability of multiple connectivity can be further limited by using a quantity of links. For example, a quantity of links in multiple connectivity in a target cell may be configured to be greater than a threshold, to ensure that there are a sufficient quantity of links in multiple connectivity in the target cell. A quantity of links in multiple connectivity in a source cell may be configured to be less than a threshold, to indicate relatively poor reliability of multiple connectivity in the source cell.

Therefore, the first information further includes a quantity of first beams and a quantity of target beams, and the target beam is at least one of a second beam, a third beam, or a fourth beam.

For example, the measurement event specifically includes at least one of the following, including a measurement result of the first beam is inferior to the fourth threshold, and/or the quantity of first beams is less than a fifth threshold, a measurement result of the target beam is superior to, by a fourth offset value, the measurement result of the first beam of the first network device or a cell measurement result of the first network device, and/or the quantity of target beams is greater than a seventh threshold, the measurement result of the target beam is superior to a sixth threshold, and/or the quantity of target beams is greater than the seventh threshold, a beam or cell measurement result of the first network device is inferior to the fourth threshold and superior to the seventh threshold, and/or the quantity of target beams is greater than the seventh threshold, and the measurement result of the target beam is superior to, by a fourth offset value, a beam or cell measurement result of a secondary cell of the first network device, and/or the quantity of target beams is greater than the seventh threshold.

In this embodiment of the present invention, a reporting condition, namely, a quantity of links in multiple connectivity, is further set in the measurement event. Especially in cell-level mobility, a quantity of links in multiple connectivity of a serving cell and a neighboring cell is considered, improving reliability for measuring cell quality. This can significantly reduce a risk of a handover to an unsuitable cell or a ping-pong handover, and reduce RRC signaling overheads caused by an improper handover.

3. Configurations for Measurement Reporting

The second information includes configuration information for the measurement reporting. The second information is further used to instruct the UE to report the first measurement result to a target network device based on a second beam.

In another possible implementation, the second information is further used to instruct the UE to report the second measurement result based on a first beam and/or a third beam and/or a fourth beam, or instruct the UE to report the first measurement result based on a cell measurement result that is obtained by using a first beam and/or a third beam and/or a fourth beam. Measurement results are reported based on types. This fully considers a beam measurement result and reduces complexity of processing a reported result by a network device. For ease of understanding, the foregoing three measurement results are compared by using Table 1. Refer to Table 1.

TABLE 1

| Measurement result | Measurement object | Example |
| --- | --- | --- |
| First measurement result | Between TRPGs | A cell measurement result obtained based on a plurality of beams is reported. |
| Second measurement result | Beams between TRPGs, beams between TPRs in a TPRG, or beams in a same TRP | Measurement results of a plurality of beams are reported. |

The target network device is a macro base station, the first network device, or a network device indicated in a measurement object. For example, in actual application, it may be set that the first measurement result is reported to a macro base station, and the second measurement result is reported to the first network device, or the first measurement result and/or the second measurement result are or is reported to the first network device, so that the macro base station and the network device may separately process different measurement results, to improve measurement result processing efficiency.

The second information further includes at least one of a measurement granularity, a measurement offset, a measurement lag, a method for filtering different measurement results, a network device identifier or a beam identifier or a beam pair identifier that needs to be measured, and a feedback resource used for performing a feedback. The different measurement results are measurement results specific to beam or cell types. The feedback resource includes a time-domain, frequency-domain, or spatial resource. The spatial resource is a beam identifier. The second information may further include a message such as a handover message, a beam addition request message, or a beam modification request message. The message includes a cell identifier and/or a beam identifier.

The measurement result includes at least one of beam signal strength obtained through measurement, cell signal strength obtained through measurement or deduction, a network device identifier, a beam identifier, and a beam pair identifier.

The cell signal strength is reference signal received power (RSRP) and/or reference signal received quality (RSRQ) at a layer 1, or RSRP and/or RSRQ obtained after filtering at a layer 2 or a layer 3. The layer 1 is a physical layer, the layer 2 is a MAC layer, and the layer 3 is an RRC layer.

Further, the second information further includes a measurement object list, the measurement object list is used to instruct the UE to measure a first measurement object in the measurement list, and the first measurement object is some of the measurement objects. The first network device may configure the measurement object list, so that the UE measures the measurement objects in the measurement object list, to reduce blind detection on the measurement objects. In another possible implementation, the first network device may alternatively configure a blacklist (for example, when it is found that a cell has a very poor signal or very heavy load). All measurement objects in the blacklist are to be excluded from UE measurement objects. Configuration of the blacklist increases measurement flexibility.

In a possible implementation, the measurement object is at least one of a network device identifier, a frequency identifier, a beam identifier, a network device group identifier, a frequency group identifier, and a beam group identifier. The identifiers are used to distinguish between different measurement tasks, and are configured over a network. Each measurement identifier corresponds to a unique measurement object and a unique group of reporting configurations. When the network performs configuration, to reduce air interface overheads, the network does not directly describe, in a measurement identifier, specific content of a measurement object and a reporting configuration that correspond to the measurement identifier, but gives only a measurement object identifier and a reporting configuration identifier that correspond to the measurement task. For example, measurement objects may include an intra-frequency measurement and an inter-frequency measurement. The intra-frequency measurement means that a pilot signal used by the UE to perform measurement comes from a carrier whose frequency is the same as that of a serving beam of the UE or the same as that of a carrier of a serving cell of the UE. The inter-frequency measurement means that a pilot signal used by the UE to perform measurement comes from a carrier whose frequency is different from that of a serving beam of the UE or different from that of a carrier of a serving cell of the UE. Each measurement object has a unique measurement object identifier and corresponds to one frequency. One frequency corresponds to a plurality of cells. When performing measurement, the UE determines a frequency for measurement based on frequency information in a measurement object, and then measures a beam at the frequency.

In another possible implementation, the second information may further include a reference signal identifier, a reference signal sequence, or a reference signal mode of a target beam, so that the terminal may implicitly deduce a corresponding network device and/or beam identifier based on a predefined mapping relationship.

The measurement object is configured based on capability information fed back by the UE, and the capability information is information indicating that the UE supports single connectivity, dual connectivity, or multiple connectivity, or that the UE supports a single beam or a plurality of beams.

Step 602: The first network device delivers the first information and/or the second information to the UE, so that the UE reports a measurement result to the first network device when a measurement event is satisfied.

The first information and the second information are delivered by using at least one of physical layer signaling, Media Access Control (MAC) layer signaling, or radio resource control (RRC) layer signaling.

It should be noted that, when the target beam in the measurement object is the second beam, the first network device sends an RRC connection reconfiguration message to the UE, where an information element in the RRC connection reconfiguration message carries the first information.

Step 603: The user equipment receives the first information and/or the second information, and performs measurement based on the first information and/or the second device.

Step 604: When the measurement event is satisfied, the user equipment reports a first measurement result and/or a second measurement result to the first network device, where the first measurement result is a cell measurement result, and the second measurement result is a beam measurement result.

When a measurement threshold is satisfied, the user equipment fills the first measurement result and/or the second measurement result based on a measurement reporting format.

The user equipment reports the first measurement result to the target network device based on the second information and based on the second beam. In another possible implementation, the user equipment reports the second measurement result based on at least one of the first beam and/or the third beam and/or the fourth beam, or reports the first measurement result based on the cell measurement result that is obtained by using at least one of the first beam, the third beam, and the fourth beam.

The first measurement result is reported by using radio resource control (RRC) layer signaling, physical layer (PHY) signaling, or Media Access Control (MAC) layer signaling. The second measurement result is reported by using physical layer signaling or MAC layer signaling.

For example, based on the second information, the user equipment may report the cell measurement result to a macro base station, and report the beam measurement result to the first network device or a network device indicated in a measurement object, or may report the first measurement result and/or the second measurement result to the first network device or a network device indicated in a measurement object.

In this embodiment of the present invention, the first network device configures different types of measurement events, and configures different thresholds based on the different types of measurement events, and/or configures the second information, where the second information is used to instruct the UE to report different types of measurement results. This fully considers a characteristic of high-gain beam coverage in a dense network or an ultra-dense network, and for mobility of user equipment, better adapts to beam measurement and adapts to measurement reporting in a future 5G network.

Figure 8:
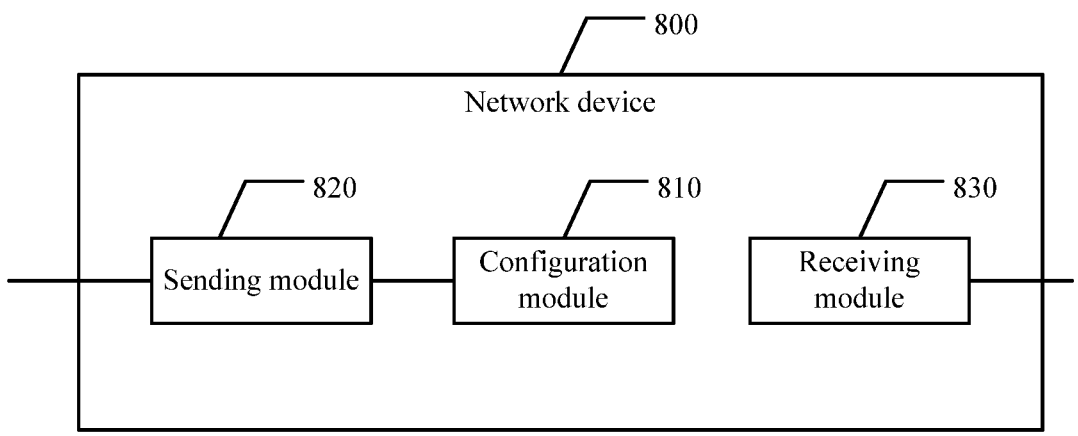
FIG. 8 is a schematic structural diagram of an embodiment of a network device according to an embodiment of the present invention.

The foregoing describes the measurement reporting method. Referring to FIG. 8, the following specifically describes a network device to which the method is applied. The present invention provides an embodiment of a network device. The network device 800 includes a configuration module 810, configured to configure first information and/or second information for user equipment UE, where the first information includes a first threshold and/or a second threshold, the first threshold is used to trigger a first type of measurement event, the second threshold is used to trigger a second type of measurement event, the second information is used to instruct the UE to report a first measurement result and/or a second measurement result, the first measurement result is a cell measurement result, and the second measurement result is a beam measurement result, a sending module 820, configured to deliver, to the UE, the first information and/or the second information configured by the configuration module 810, so that the UE reports a measurement result to the network device when a measurement event is satisfied, and a receiving module 830, configured to receive the measurement result sent by the UE.

Specifically, the configuration module 810 is configured to perform step 601 in the embodiment corresponding to FIG. 6, and the sending module 820 is configured to perform step 602 in the embodiment corresponding to FIG. 6. For specific descriptions of the network device, refer to the descriptions in the embodiment corresponding to FIG. 6. Details are not described herein again.

Further, the network device in FIG. 8 is presented in a form of a functional module. Herein, the "module" may be an application-specific integrated circuit (application-specific integrated circuit, ASIC), a circuit, a processor 930 that executes one or more software or firmware programs and a memory 910, an integrated logic circuit, and/or another device that can provide the foregoing functions. In a simple embodiment, the network device in FIG. 8 may be in a form shown in FIG. 9. The modules may be implemented by a processor 930, a transceiver 920, and a memory 910 in FIG. 9.

The memory 910 is configured to store computer executable program code, and may be one or more storage media (for example, one or more massive storage devices) that store application programs or data. The memory 910 and the storage medium may be transient memories or persistent memories. A program stored in the storage medium may include one or more modules (which are not shown in the figure), and each module may include a series of instruction operations in the network device.

The transceiver 920 is configured to deliver first information and/or second information to user equipment, and is further configured to receive a first measurement result and/or a second measurement result reported by a user.

The processor 930 is coupled to the memory 910 and the transceiver 920.

The program code includes an instruction, and when the processor 930 executes the instruction, the instruction enables the network device to perform the method actually performed by the network device in the embodiment corresponding to FIG. 6.

Figure 10:
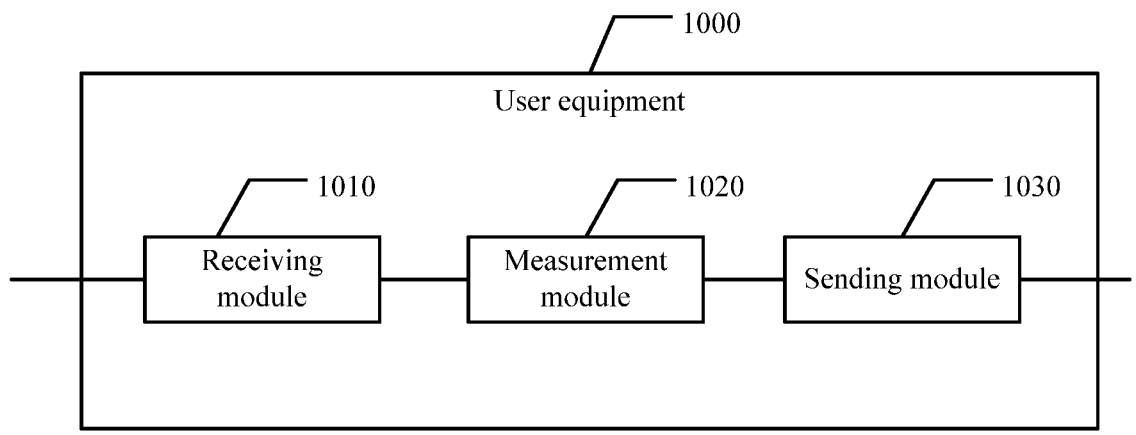
FIG. 10 is a schematic structural diagram of an embodiment of user equipment according to an embodiment of the present invention.

Referring to FIG. 10, the present invention provides an embodiment of user equipment. The user equipment 1000 includes a receiving module 1010, configured to receive first information and/or second information sent by a first network device, where the first information includes a first threshold and/or a second threshold, the first threshold is used to trigger a first type of measurement event, and the second threshold is used to trigger a second type of measurement event, a measurement module 1020, configured to perform measurement based on the first information and/or the second information received by the receiving module 1010, and a sending module 1030, configured to when the measurement module 1020 determines that a measurement event is satisfied, report a first measurement result and/or a second measurement result based on the second information, where the first measurement result is a cell measurement result, and the second measurement result is a beam measurement result.

Specifically, the receiving module 1010 is configured to perform the step of receiving the first information and/or the second information in step 603 in the embodiment corresponding to FIG. 6, the measurement module 1020 is configured to perform the step of performing measurement based on the first information and/or the second device in step 603 in the embodiment corresponding to FIG. 6, and the sending module 1030 is configured to perform step 604 in the embodiment corresponding to FIG. 6. For specific descriptions of the user equipment, refer to the descriptions in the embodiment corresponding to FIG. 6. Details are not described herein again.

Further, the user equipment in FIG. 10 is presented in a form of a functional module. Herein, the "module" may be an application-specific integrated circuit (application-specific integrated circuit, ASIC), a circuit, a processor that executes one or more software or firmware programs and a memory, an integrated logic circuit, and/or another device that can provide the foregoing functions. In a simple embodiment, the user equipment in FIG. 10 may be in a form shown in FIG. 11.

Figure 11:
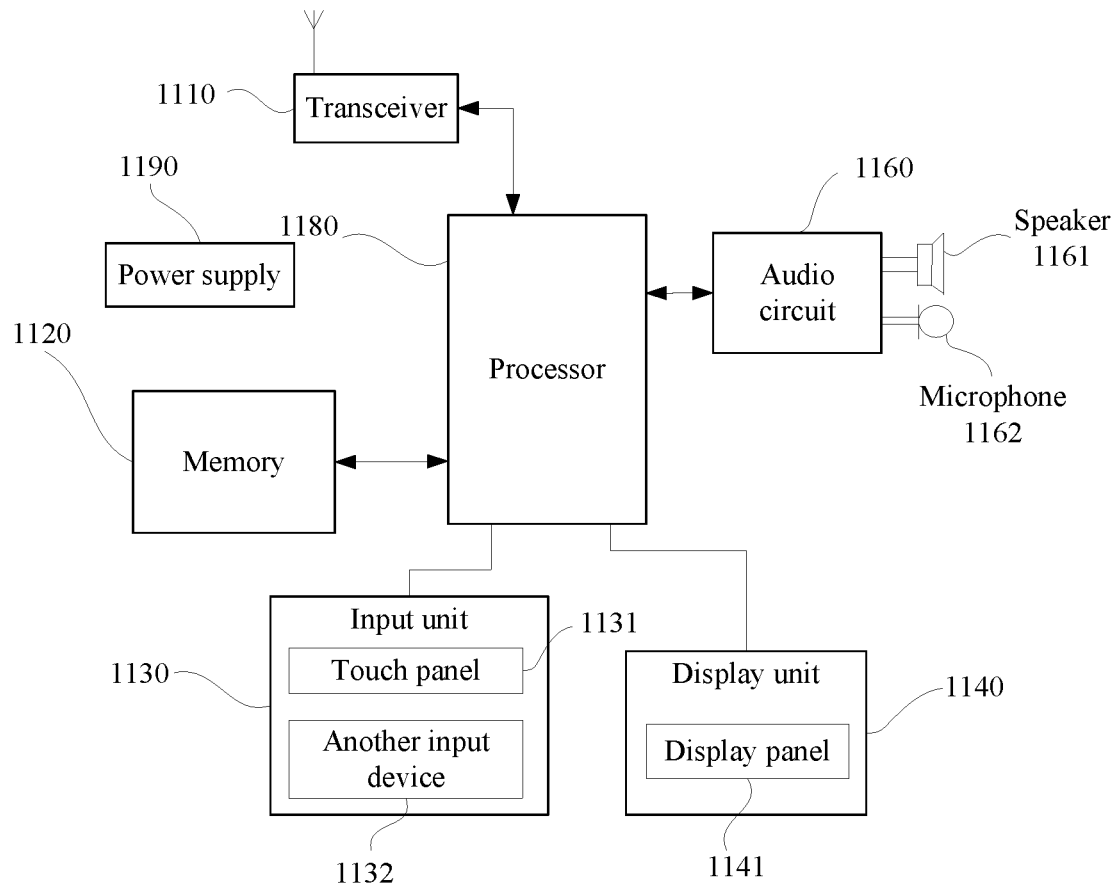
FIG. 11 is a schematic structural diagram of another embodiment of user equipment according to an embodiment of the present invention.

An embodiment of the present invention further provides another user equipment 1100. As shown in FIG. 11, for ease of description, only a part related to this embodiment of the present invention is shown. For specific technical details that are not disclosed, refer to the method part of the embodiments of the present invention. The user equipment is described by using a mobile phone as an example.

FIG. 11 is a block diagram of a partial structure of a terminal-related mobile phone according to an embodiment of the present invention. Referring to FIG. 11, the mobile phone includes components such as a transceiver 1110, a memory 1120, an input unit 1130, a display unit 1140, a sensor 1150, an audio circuit 1160, a processor 1180, and a power supply 1190. Persons skilled in the art may understand that, the mobile phone structure shown in FIG. 11 does not constitute a limitation to the mobile phone. The mobile phone may include more or fewer components than those shown in the figure, or may combine some components, or may have a different component layout.

The following specifically describes the composition components of the mobile phone with reference to FIG. 11.

The transceiver 1110 may be configured to send or receive a signal in an information sending/receiving or call process, and in particular, receive downlink information from a network device and send the downlink information to the processor 1180 for processing, and send an uplink-related measurement result to the network device. Usually, the transceiver 1110 includes but is not limited to an antenna, at least one amplifier, a transceiver, a coupler, a low noise amplifier (LNA), a duplexer, and the like.

The memory 1120 may be configured to store a software program and a module. The processor 1180 runs the software program and the module that are stored in the memory 1120, to perform various function applications and data processing of the mobile phone. The memory 1120 may mainly include a program storage area and a data storage area. The program storage area may store an operating system, and an application program required by at least one function. In addition, the memory 1120 may include a high-speed random access memory, and may further include a nonvolatile memory, for example, at least one magnetic disk storage device, a flash memory device, or another volatile solid-state storage device.

The input unit 1130 may be configured to receive entered numerical or character information, and generate key signal inputs that are related to user settings and function control of the mobile phone. Specifically, the input unit 1130 may include a touch panel 1131 and another input device 1132.

The display unit 1140 may be configured to display information entered by a user or information provided for a user, and various menus of the mobile phone. The display unit 1140 may include a display panel 1141. In FIG. 11, the touch panel 1131 and the display panel 1141 are two independent components to implement input and input functions of the mobile phone. However, in some embodiments, the touch panel 1131 and the display panel 1141 may be integrated to implement the input and output functions of the mobile phone.

The audio circuit 1160, a speaker 1161, and a microphone 1162 may provide an audio interface between the user and the mobile phone. The audio circuit 1160 may transmit, to the speaker 1161, an electrical signal that is converted from received audio data. The speaker 1161 converts the electrical signal into a sound signal and outputs the sound signal.

The processor 1180 is a control center of the mobile phone, connects various parts of the entire mobile phone by using various interfaces and lines, and performs various functions and data processing of the mobile phone by running or executing the software program and/or the module stored in the memory 1120 and invoking data stored in the memory 1120, so as to perform overall monitoring on the mobile phone. The mobile phone further includes the power supply 1190 (such as a battery) that supplies power to various components. Preferably, the power supply may be logically connected to the processor 1180 by using a power supply management system, so as to implement, by using the power supply management system, functions such as charging management, discharging management, and power consumption management.

In this embodiment of the present invention, the processor 1180 included in the user equipment further has a function of enabling the user equipment to perform the method actually performed by the user equipment in the embodiment corresponding to FIG. 6.

Figure 9:
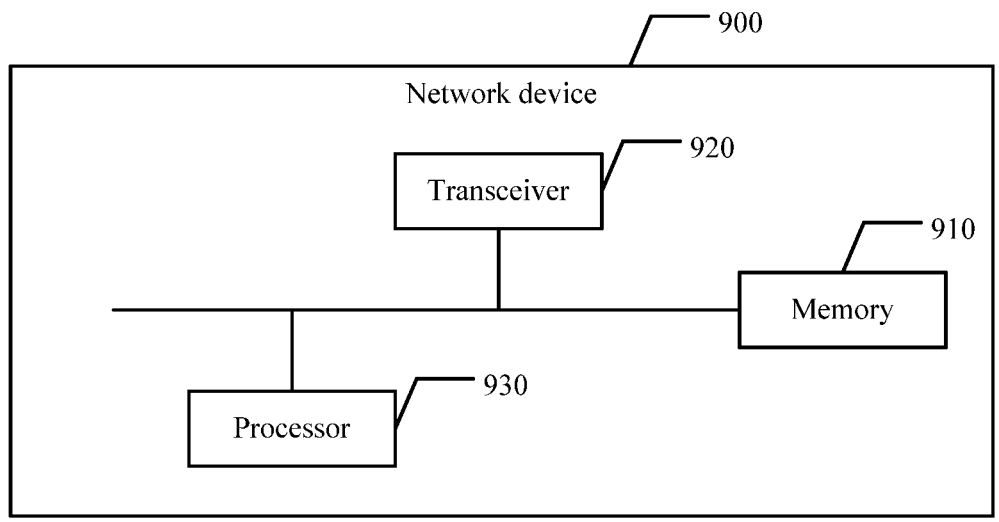
FIG. 9 is a schematic structural diagram of another embodiment of a network device according to an embodiment of the present invention.

An embodiment of the present invention further provides a computer storage medium, configured to store a computer software instruction used by the network device shown in FIG. 8 and FIG. 9 or the user equipment shown in FIG. 10 and FIG. 1*i*. The computer software instruction includes a program designed to perform the foregoing method embodiment. A resource can be obtained by executing the stored program.

Persons of ordinary skill in the art should understand that all or some of subject matters in this application may be implemented in software in combination with hardware and/or firmware. For example, the subject matters described in this specification may be implemented in software that is executed by one or more processors. In an example of an implementation, the subject matters described in this specification may be implemented by using a non-transitory computer readable medium that stores a computer executable instruction. When a processor of a computer executes the computer executable instruction, the instruction controls the computer to perform steps. An example of a computer readable medium applicable to implementation of the subject matters described in this specification includes the non-transitory computer readable medium, such as a magnetic disk storage device, a chip storage device, a programmable logic device, or an application-specific integrated circuit. In addition, the computer readable medium that implements the subject matters described in this specification may be located on a single device or computing platform, or may be distributed on a plurality of devices or computing platforms.

Finally, it should be noted that the foregoing embodiments are merely intended to describe the technical solutions of the present invention, but not to limit the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. A measurement reporting method, comprising:
    configuring, by a first network device, at least one of first information or second information for user equipment, wherein the first information comprises at least one of a first threshold or a second threshold, wherein the first threshold is associated with triggering a first type of measurement event, wherein a first magnitude of the first threshold is set by the first network device according to the type of the first type of measurement event, wherein the second threshold is associated with triggering a second type of measurement event, wherein a second magnitude of the second threshold is set by the first network device according to the type of the second type of measurement event and is different from the first magnitude, wherein the second information instructs the user equipment to report, based on the measurement event, at least one of only a second measurement result or both a first measurement result and the second measurement result, wherein the first measurement result is a cell measurement result, wherein the second measurement result is a beam measurement result, wherein the first measurement result is associated with cell-level mobility requiring transferring using radio resource control (RRC) signaling, and wherein the second measurement result is associated with beam-level mobility permitting transferring without radio resource control (RRC) signaling;
    delivering, by the first network device, the at least one of first information or the second information to the user equipment, the delivering causing the user equipment to report a measurement result to the first network device in response to a measurement event being satisfied; and
    receiving, by the first network device, the measurement result sent by the user equipment.

2. The measurement reporting method according to claim 1, wherein the first type of measurement event is at least one of a cell change, cell switching, or a cell handover, and wherein the second type of measurement event is at least one of a beam change or beam switching.

3. The measurement reporting method according to claim 1, wherein the first type of measurement event is an event between a network device group to which the first network device belongs and a network device group to which a second network device belongs.

4. The measurement reporting method according to claim 1, wherein the second type of measurement event is an event between at least one of different network devices in a network device group to which the first network device belongs, or different beams associated with the first network device.

5. The measurement reporting method according to claim 1, wherein the first type of measurement event is at least one of a measurement result of a first beam being inferior to the first threshold, or a measurement result of a second beam being superior to the first threshold, or the measurement result of the second beam being superior to that of the first beam by a first offset value; and
    wherein the second type of measurement event is at least one of the measurement result of the first beam being inferior to the second threshold, a measurement result of a third beam being superior to the second threshold, or the measurement result of the third beam being superior to that of the first beam by a second offset value.

6. The measurement reporting method according to claim 1, wherein the first information further comprises a third threshold, and wherein the third threshold is associated with triggering a third type of measurement event;
    wherein the second type is an event between different network devices in a network device group to which the first network device belongs; and
    wherein the third type an event between different beams in the first network device.

7. The measurement reporting method according to claim 6, wherein the third type of measurement event is at least one of a measurement result of a first beam being inferior to the third threshold, or a measurement result of a fourth beam being superior to the third threshold, or the measurement result of the fourth beam being superior to that of the first beam by a third offset value.

8. The measurement reporting method according to claim 1, wherein the first information further comprises at least one of a quantity of first beams or a quantity of target beams, and wherein the target beams comprise at least one of a second beam, a third beam, or a fourth beam.

9. The measurement reporting method according to claim 8, wherein the measurement event further comprises at least one of a measurement result of a first beam of the first beams being inferior to a fourth threshold, or a quantity of connection beams in the first network device being less than a fifth threshold; and
    wherein the measurement event further comprises a measurement result of the target beam being superior to a sixth threshold, or the quantity of target beams being greater than a seventh threshold.

10. The measurement reporting method according to claim 8, wherein the measurement event comprises at least one of:
the measurement result of a first beam of the first beams being inferior to a fourth threshold, or the quantity of first beams being less than a fifth threshold;
the measurement result of a target beam of the first beams being superior to, by a fourth offset value, at least one of the measurement result of the first beam of the first network device or a cell measurement result of the first network device, or a quantity of target beams being greater than a seventh threshold;
the measurement result of the target beam being superior to a sixth threshold, or the quantity of target beams being greater than the seventh threshold;
a beam or cell measurement result of the first network device being inferior to the fourth threshold, the measurement result of the target beam being superior to the seventh threshold, or the quantity of target beams being greater than the seventh threshold; or
the measurement result of the target beam being superior to, by a fourth offset value, a beam or cell measurement result of a secondary cell of the first network device, or the quantity of target beams being greater than the seventh threshold.

11. A measurement reporting method, applied in a user equipment, comprising:
receiving at least one of first information or second information sent by a first network device, wherein the first information comprises at least one of a first threshold or a second threshold, wherein the first threshold is associated with triggering a first type of measurement event, wherein the second threshold is associated with triggering a second type of measurement event, wherein a first magnitude of the first threshold is set by the first network device according to the type of the first type of measurement event, and wherein a second magnitude of the second threshold is set by the first network device according to the type of the second type of measurement event and is different from the first magnitude;
performing measurement based on at least one of the first information or the second information; and
reporting in response to a measurement event being satisfied, and based on the measurement event, at least one of only a second measurement result or both a first measurement result and the second measurement result based on the second information, wherein the first measurement result is a cell measurement result, wherein the second measurement result is a beam measurement result, wherein the first measurement result is associated with cell-level mobility requiring transferring using radio resource control (RRC) signaling, and wherein the second measurement result is associated with beam-level mobility permitting transferring without radio resource control (RRC) signaling.

12. The measurement reporting method according to claim 11, wherein the first type of measurement event is at least one of a cell change, cell switching, or a cell handover, and wherein the second type of measurement event is at least one of a beam change or beam switching.

13. The measurement reporting method according to claim 11, wherein the first type of measurement event is an event between a network device group to which the first network device belongs and a network device group to which a second network device belongs.

14. The measurement reporting method according to claim 11, wherein the second type of measurement event is an event that is at least one of between different network devices in a network device group to which the first network device belongs, or between different beams in the first network device.

15. The measurement reporting method according to claim 11, wherein the first type of measurement event is at least one of a measurement result of a first beam being inferior to the first threshold, or a measurement result of a second beam being superior to the first threshold, or the measurement result of the second beam being superior to that of the first beam by a first offset value; and
wherein the second type of measurement event is at least one of the measurement result of the first beam being inferior to the second threshold, a measurement result of a third beam being superior to the second threshold, or the measurement result of the third beam being superior to that of the first beam by a second offset value.

16. The measurement reporting method according to claim 11, wherein the first information further comprises a third threshold, and wherein the third threshold is associated with triggering a third type of measurement event;
wherein the second type is an event between different network devices in a network device group to which the first network device belongs; and
wherein the third type is an event between different beams in the first network device.

17. The measurement reporting method according to claim 16, wherein the third type of measurement event is at least one of a measurement result of a first beam being inferior to the third threshold, or a measurement result of a fourth beam being superior to the third threshold, or the measurement result of the fourth beam being superior to that of the first beam by a third offset value.

18. The measurement reporting method according to claim 11, wherein the first information further comprises at least one of a quantity of first beams or a quantity of target beams, and wherein the target beams comprise at least one of a second beam, a third beam, or a fourth beam.

19. The measurement reporting method according to claim 18, wherein the measurement event further comprises at least one of a measurement result of a first beam of the first beams being inferior to a fourth threshold, or a quantity of connection beams in the first network device being less than a fifth threshold; and
wherein the measurement event further comprises a measurement result of the target beam being superior to a sixth threshold, or the quantity of target beams being greater than a seventh threshold.

20. A communications apparatus, comprising:
a processor; and
a non-transitory memory storing computer executable program code for execution by the processor, the program code including instructions for:
receiving at least one of first information or second information sent by a first network device, wherein the first information comprises at least one of a first threshold or a second threshold, wherein the first threshold is associated with triggering a first type of measurement event, wherein the second threshold is associated with triggering a second type of measurement event, wherein a first magnitude of the first threshold is set by the first network device according to the type of the first type of measurement event, and wherein a second magnitude of the second threshold is set by the first network device according to the type of the second type of measurement event and is different from the first magnitude;

performing measurement based on at least one of the first information or the second information; and reporting, in response to a measurement event being satisfied, and based on the measurement event, at least one of only a second measurement result or both a first measurement result and the second measurement result based on the second information, wherein the first measurement result is a cell measurement result, wherein the second measurement result is a beam measurement result, wherein the first measurement result is associated with cell-level mobility requiring transferring using radio resource control (RRC) signaling, and wherein the second measurement result is associated with beam-level mobility permitting transferring without radio resource control (RRC) signaling.

\* \* \* \* \*

UNITED STATES PATENT AND TRADEMARK OFFICE
CERTIFICATE OF CORRECTION

PATENT NO. : 12,047,803 B2
APPLICATION NO. : 17/830579
DATED : July 23, 2024
INVENTOR(S) : Zhang et al.

It is certified that error appears in the above-identified patent and that said Letters Patent is hereby corrected as shown below:

In the Claims

In Column 23, in Claim 10, Line 7, delete "a target beam of the first beams" and insert -- the target beam --.

In Column 23, in Claim 11, Line 45, delete "reporting" and insert -- reporting, --.

Signed and Sealed this
Twentieth Day of August, 2024

Katherine Kelly Vidal
*Director of the United States Patent and Trademark Office*